US011874940B2

(12) United States Patent
Chopra et al.

(10) Patent No.: US 11,874,940 B2
(45) Date of Patent: Jan. 16, 2024

(54) METHOD AND SYSTEM FOR LIMITING ACCESS OF MULTIPLE DATA NODES TO SHARED STORAGE DURING THE PERFORMANCE OF DATA PROTECTION SERVICES THROUGH LOAD BALANCING

(71) Applicant: EMC IP Holding Company LLC, Hopkinton, MA (US)

(72) Inventors: Shelesh Chopra, Bangalore (IN); Sunil Yadav, Bangalore (IN); Manish Sharma, Bangalore (IN); Aaditya Rakesh Bansal, Bagalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 449 days.

(21) Appl. No.: 17/238,718

(22) Filed: Apr. 23, 2021

(65) Prior Publication Data

US 2022/0343007 A1 Oct. 27, 2022

(51) Int. Cl.
*G06F 21/62* (2013.01)
(52) U.S. Cl.
CPC .................. *G06F 21/6218* (2013.01)
(58) Field of Classification Search
CPC .................................................. G06F 21/6218
See application file for complete search history.

(56) References Cited

U.S. PATENT DOCUMENTS 10,359,968 B1 * 7/2019 Chen ....................... G06F 16/10
2021/0409413 A1 * 12/2021 Mariappan ....... G06K 19/06037

* cited by examiner

Primary Examiner — Brian F Shaw
(74) Attorney, Agent, or Firm — Chamberlain, Hrdlicka, White, Williams & Aughtry; Aly Z. Dossa

(57) ABSTRACT

Techniques described herein relate to a method for performing data protection services for data stored in a shared storage. The method may include identifying, by a primary data node, a protection policy event initiating performance of data protection services for data stored in the shared storage used by the primary data node and secondary data nodes; in response to identifying the protection policy event: obtaining primary data node monitoring information associated with the primary data node; obtaining secondary data node monitoring information associated with the secondary data nodes; assigning at least one resource limit to the primary data node and the secondary data nodes based on the primary data node monitoring information and the secondary data node monitoring information; and initiating performance of the data protection services by the primary data node and the secondary data nodes based on the assigned at least one resource limit.

20 Claims, 8 Drawing Sheets

METHOD AND SYSTEM FOR LIMITING ACCESS OF MULTIPLE DATA NODES TO SHARED STORAGE DURING THE PERFORMANCE OF DATA PROTECTION SERVICES THROUGH LOAD BALANCING

BACKGROUND

Computing devices may provide services. To provide the services, the computing devices may include hardware components and software components. Data may be generated by the computing devices during the performance of the services. The data may be important to users. To protect the data, backups of the data may be generated and stored in storage devices. The storage devices may be shared amongst other computing devices.

SUMMARY

In general, certain embodiments described herein relate to a method for performing data protection services for data stored in a shared storage. The method may include identifying, by a primary data node, a protection policy event initiating performance of data protection services for data stored in the shared storage used by the primary data node and secondary data nodes; in response to identifying the protection policy event: obtaining primary data node monitoring information associated with the primary data node; obtaining secondary data node monitoring information associated with the secondary data nodes; assigning at least one resource limit to the primary data node and the secondary data nodes based on the primary data node monitoring information and the secondary data node monitoring information; and initiating performance of the data protection services by the primary data node and the secondary data nodes based on the assigned at least one resource limit.

In general, certain embodiments described herein relate to a system for performing data protection services for data stored in a shared storage. The system may include a shared storage and a primary data node that is programmed to identify a protection policy event initiating performance of data protection services for data stored in the shared storage used by the primary data node and secondary data nodes; in response to identifying the protection policy event: obtain primary data node monitoring information associated with the primary data node; obtain secondary data node monitoring information associated with the secondary data nodes; assign at least one resource limit to the primary data node and the secondary data nodes based on the primary data node monitoring information and the secondary data node monitoring information; and initiate performance of the data protection services by the primary data node and the secondary data nodes based on the assigned at least one resource limit.

In general, certain embodiments described herein relate to a non-transitory computer readable medium that includes computer readable program code, which when executed by a computer processor enables the computer processor to perform a method for performing data protection services for data stored in a shared storage. The method may include identifying, by a primary data node, a protection policy event initiating performance of data protection services for data stored in the shared storage used by the primary data node and secondary data nodes; in response to identifying the protection policy event: obtaining primary data node monitoring information associated with the primary data node; obtaining secondary data node monitoring information associated with the secondary data nodes; assigning at least one resource limit to the primary data node and the secondary data nodes based on the primary data node monitoring information and the secondary data node monitoring information; and initiating performance of the data protection services by the primary data node and the secondary data nodes based on the assigned at least one resource limit.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
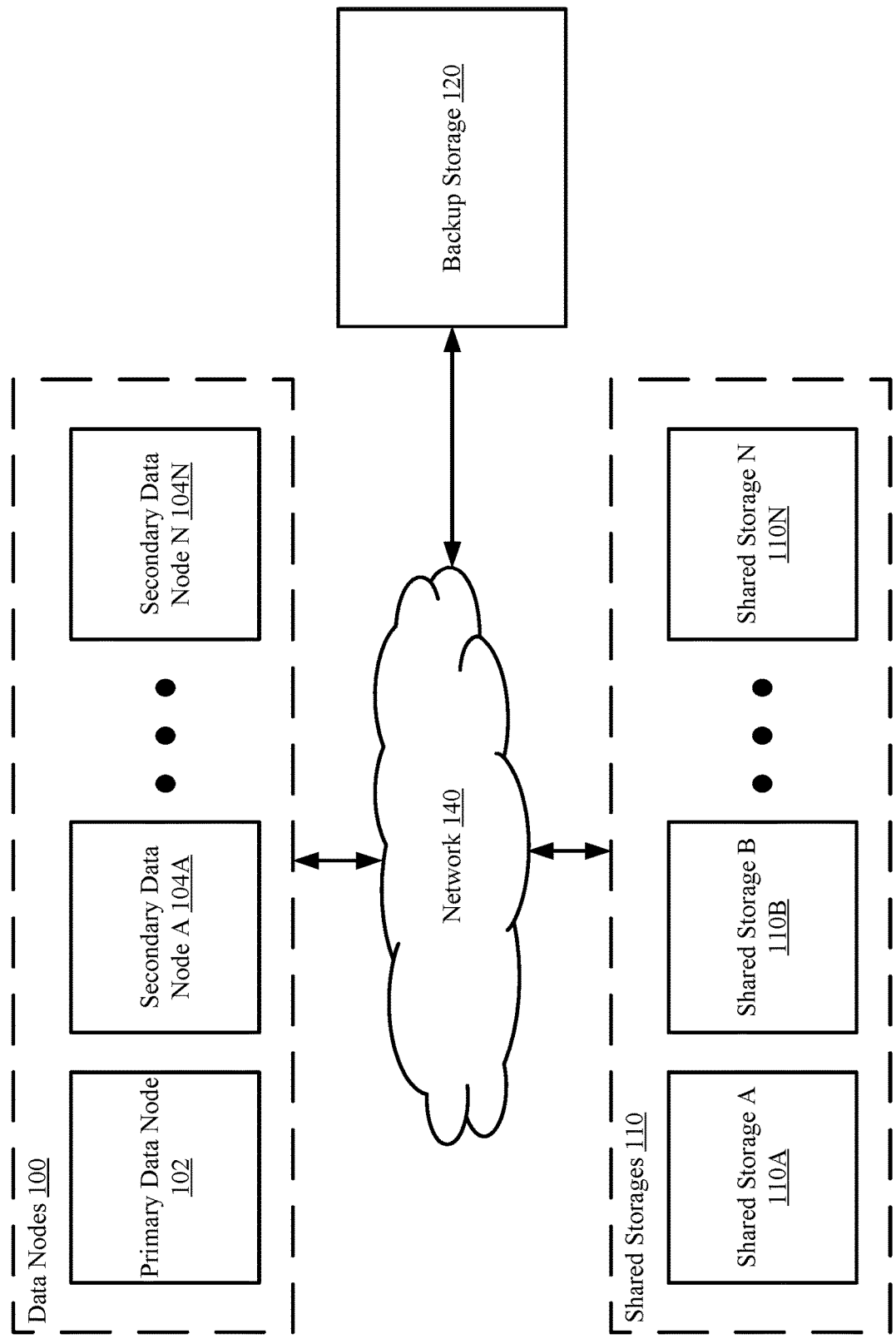
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to limiting access to shared storage during the performance of data protection services. A primary data node application agent may assign data limits and bandwidth limits to each data node performing the data protection services based on monitoring information associated with the performance of data protection workloads and application workloads for each data node. The monitoring information enables the primary data node application agent to assign portions of available capacity of the shared storage and portions of available network capacity of the shared storage to the data nodes as data limits and bandwidth limits respectfully. Each data node independently performs data protection services using the corresponding data limits and bandwidth limits. As a result, each data node may be able to provide data protection services for data stored in shared storage without negatively impacting the performance of other data protection services and application workloads of other data nodes competing for access to the shared storage.

FIG. 1A shows a diagram of a system in accordance with one or more embodiments of the invention. The system may include data nodes (100), shared storages (110), a backup storage (120), and a network (140). The system may include additional, fewer, and/or different components without departing from the invention. Each component may be operably connected to any of the other components via any combination of wired and/or wireless connections. Each of the aforementioned components is discussed below.

In one or more embodiments of the invention, the data nodes (100) perform workloads and provide services to clients and/or other entities not shown in the system illustrated in FIG. 1A. During the performance of the aforementioned services, data may be generated and/or otherwise obtained. The data nodes may not include the resources to store the data, and therefore, obtain data storage services from the shared storage (110). The data storage services may include storing, modifying, obtaining, and/or deleting data stored on the shared storages (110). The data storage services may include other and/or additional services without departing from the invention. The data generated and stored on the shared storages (110) by the data nodes (100) may be valuable to users of the system, and therefore may be protected. The data nodes (100) may obtain backup storage services from the backup storage (120). The backup storage services may include storing backups of data stored on the shared storages for restoration purposes. The backup storage services may include other and/or additional services without departing from the invention. The data nodes (100) may include the functionality to perform data protection services for data stored in the shared storages (110). The data protection services may include generating backups of data stored in the shared storages (110) and storing the backups in the backup storage (110). The data nodes (100) may include the functionality to perform other and/or additional services without departing from the invention.

The data nodes (100) may include a primary data node (102) and secondary data nodes. The data nodes (100) may include any number of secondary data nodes without departing from the invention. The data nodes (100) may include secondary data node A (104A) and secondary data node N (104N). Each data node (102, 104A, 104N), may be operably connected to one or more shared storages (110) and may obtain data storage services from the one or more shared storages (110). For additional information regarding the primary data node (102), refer to FIG. 1B. For addition information regarding the secondary data nodes (e.g., 104A, 104N), refer to FIG. 1C.

Figure 5:
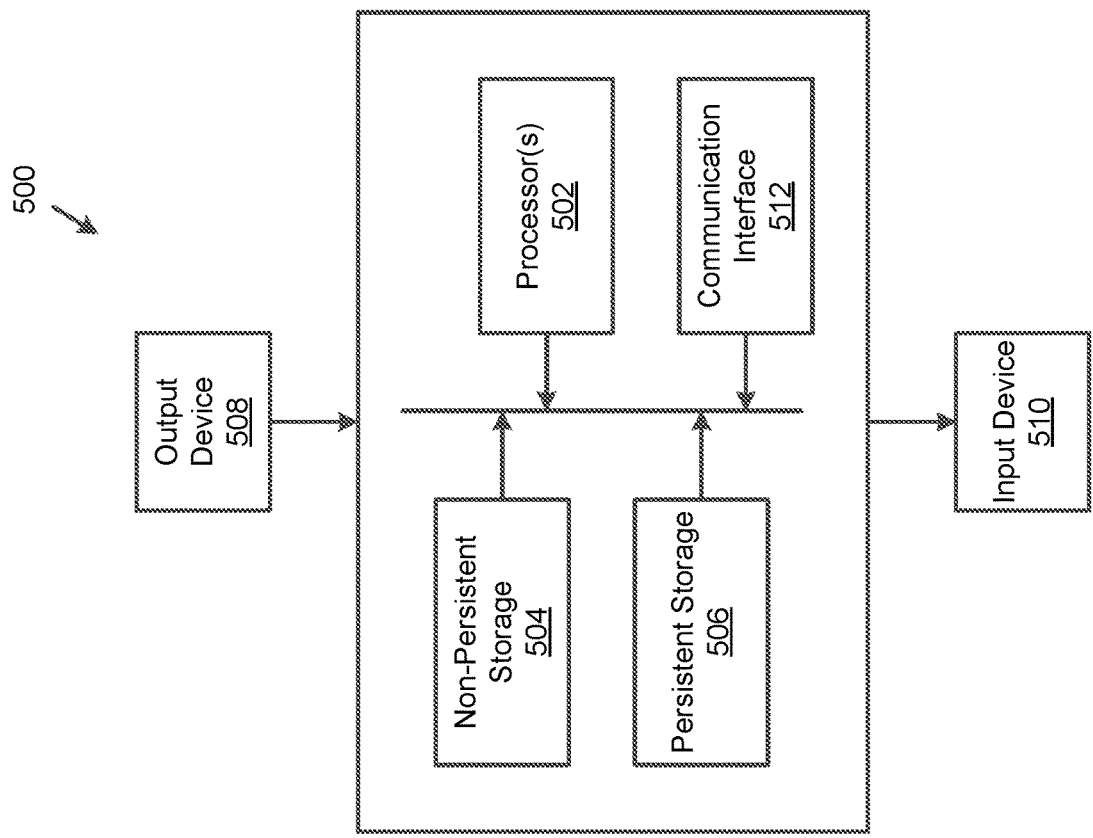
FIG. 5 shows a diagram of a computing device in accordance with one or more embodiments of the invention.

In one or more embodiments of the invention, the data nodes (100) are implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data nodes (100) described throughout this application.

In one or more embodiments of the invention, the data nodes (100) are implemented as a logical device. The logical device may utilize the computing resources of any number of computing devices and thereby provide the functionality of the data nodes (100) described throughout this application.

In one or more embodiments of the invention, the shared storages (110) provide data storage services to the data nodes (100). As discussed above, the data storage services may include storing, modifying, obtaining, and/or deleting data stored on the shared storages (110) based on instructions and/or data obtained from the data nodes (100). The data storage services may include other and/or additional services without departing from the invention. The shared storages (110) may include any number of shared storages without departing from the invention. The shared storages (110) may include shared storage A (110A), shared storage B (110B), and shared storage N (110N). Each shared storage (110A, 110B, 110N) may provide data storage services to two or more data nodes (100). The shared storages (110) may include other and/or additional services without departing from the invention.

The shared storages (110) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the shared storages (110) may utilize portions of any combination of hard disk drives, solid state disk drives, tape drives, and/or any other physical storage medium of any number of computing devices.

In one or more embodiments of the invention, the shared storages (110) are implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the shared storages (110) described throughout this application.

In one or more embodiments of the invention, the shared storages (110) are implemented as a logical device. The logical device may utilize the computing resources of any number of computing devices and thereby provide the functionality of the shared storages (110) described throughout this application.

In one or more embodiments of the invention, the backup storage (120) includes the functionality to provide backup storage services to the data nodes (100) as discussed above. The backup storage services may include (i) obtaining backups of data generated through the performance of computer implemented services from the data nodes (100), (ii) storing data and metadata associated with the backups in persistent storage of the backup storage (120), and (iii) providing backups to the data nodes (100) for restoration purposes and/or other and/or additional purposes without departing from the invention. The backup storage services may include the functionality to provide and/or obtain other and/or additional services without departing from the invention. The backup storage (120) may include any number of backup storages without departing from the invention.

In one or more embodiments of the invention, the backup storage (120) is implemented as a computing device (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a backup storage (120) described throughout this application.

In one or more embodiments of the invention, the backup storage (120) is implemented as a logical device. The logical device may utilize the computing resources of any number of computing devices and thereby provide the functionality of the backup storage (120) described throughout this application.

In one or more embodiments of the invention, each component of the system discussed above may be operatively connected to any of the other components through the network (140). A network (e.g., network (140)) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

In one or more embodiments, although shown separately in FIG. 1, the network (140) may include any number of devices within any components (e.g., 100, 110, 120) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols, which may include discovery schemes by which a given network device may obtain information about all or any of the network topology in which the network device exists. Such discovery schemes may include sharing of information between network devices, and may also include providing information to other devices within the system, such as, for example, data nodes (100), backup storage (120) and/or shared storages (110).

Figure 1B:
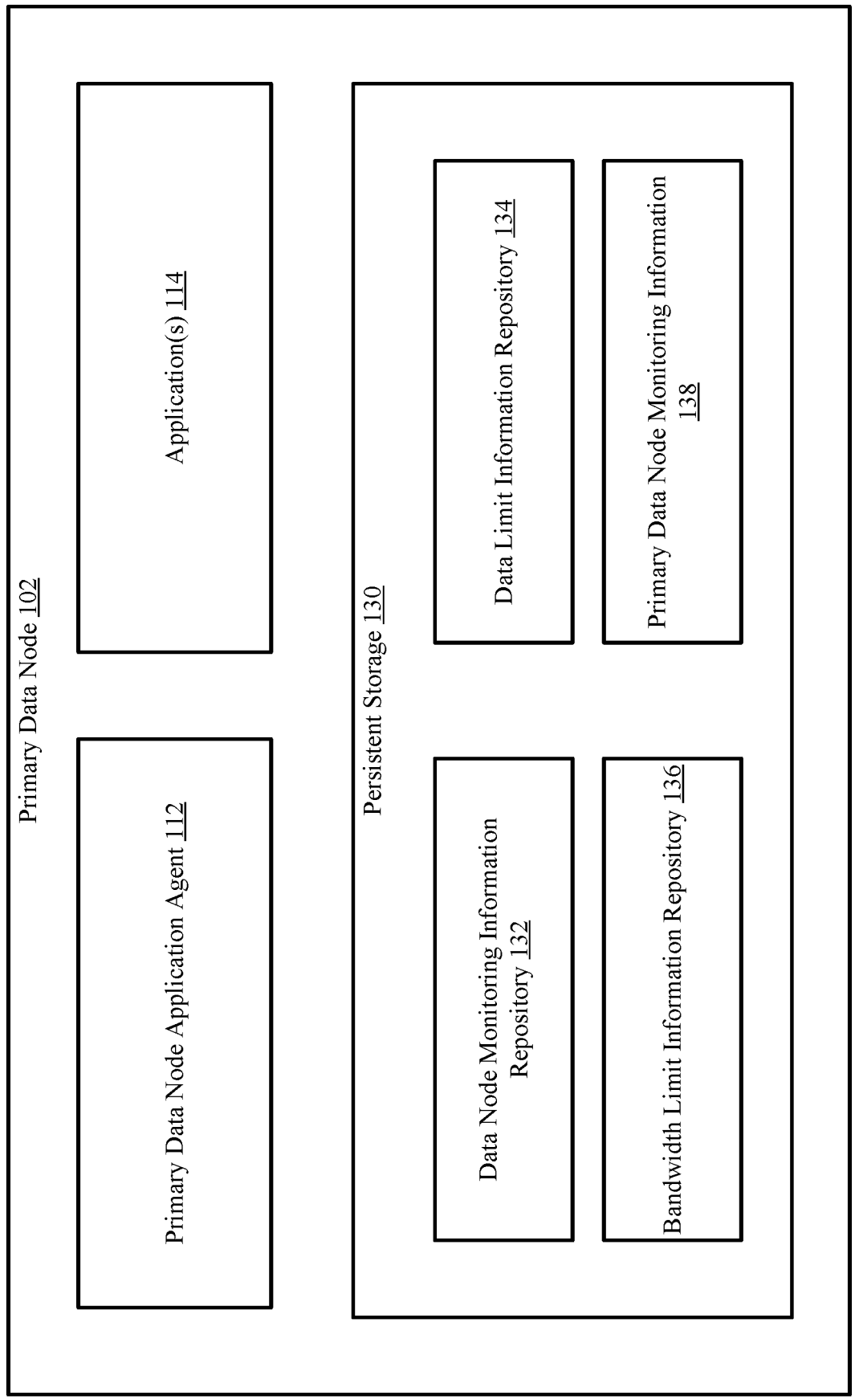
FIG. 1B shows a diagram of a primary data node in accordance with one or more embodiments of the invention.

FIG. 1B shows a diagram of a primary data node in accordance with one or more embodiments of the invention. The primary data node (102) may be an embodiment of the primary data node (102, FIG. 1A) discussed above. As discussed above, the primary data node (102) may provide services to clients and/or other entities not shown in the system illustrated in FIG. 1A and obtain backup storage services from the backup storage (120, FIG. 1A). Additionally, the primary data node (102) may also perform data protection services for data associated with the primary data node stored on shared storages (120, FIG. 1A). Furthermore, the primary data node (102) may also include the functionality to provide data protection management services for the data nodes (100, FIG. 1A). The primary data node (102) may provide and/or obtain other and/or additional services without departing from the invention. To provide the aforementioned functionality, the primary data node (102) may include a primary data node application agent (112), application(s) (114) and persistent storage (130). The primary data node (102) may include other and/or additional components without departing from the invention. Each of the aforementioned components is discussed below.

In one or more embodiments of the invention, the primary data node application agent (112) includes the functionality to perform data protection management services for the data nodes (100, FIG. 1A) as discussed above. The data protection management services may include (i) identifying protection policy events initiating the performance of data protection services for data stored in shared storages (110, FIG. 1A), (ii) obtaining monitoring information (discussed below) associated with the primary data node (102) and the secondary data nodes (104A, 104N, FIG. 1A), (iii) assigning data limits (discussed below) to the primary data node (102) and the secondary data nodes (104A, 104N, FIG. 1A) based on the obtained monitoring information, (iv) assigning bandwidth limits (discussed below) to the primary data node (102) and the secondary data nodes (104A, 104N, FIG. 1A) based on the monitoring information and the assigned data limits, and (v) initiating the performance of data protection services by the primary data node (102) and the secondary data nodes (104A, 104N, FIG. 1A) based on the assigned data limits and bandwidth limits. The primary data node application agent may perform the data protection management services as discussed in FIGS. 3A-3B. The data protection management services may include other and/or additional services without departing from the invention.

In one or more embodiments of the invention, the primary data node application agent (112) includes the functionality to perform data protection services as discussed above. The data protection services may include (i) generating backups of data stored in the shared storages (110, FIG. 1A) based on data limits and bandwidth limits assigned to the primary data node (102) (ii) storing the generated backups in the backup storage (120, FIG. 1A), and (iii) generating monitoring information associated with the primary data node (102). The data protection services may include other and/or additional services without departing from the invention.

In one or more embodiments of the invention, the primary data node application agent (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the primary data node application agent (112) described throughout this application.

In one or more embodiments of the invention, the primary data node application agent (112) is implemented as computer instructions, e.g., computer code, stored on a persistent storage that when executed by a processor of the primary data node (102) causes the primary data node (102) to provide the functionality of the primary data node application agent (112) described throughout this application.

In one or more embodiments of the invention, the primary data node (102) hosts one or more applications (114). In one or more embodiments of the invention, the application(s) (114) perform computer implemented services for clients (not shown in FIG. 1A). Performing the computer implemented services may include performing workloads (e.g., data processing) that result in the generation of data that is that is stored in a shared storage of the shared storages (110). The computer implemented services may include other and/or additional services without departing from the invention. The application(s) (114) and/or users of the client(s) (100, FIG. 1A) may include functionality for performing the aforementioned workloads in the primary data node (102). The application(s) (114) may be, for example, instances of databases, email servers, and/or other applications. The primary data node (102) may host other types of applications without departing from the invention.

In one or more of embodiments of the invention, the application(s) (114) is implemented as computer instructions, e.g., computer code, stored on a persistent storage (e.g., 130) that when executed by a processor(s) of the primary data node (102) cause the primary data node (102) to provide the functionality of the application(s) (114) described throughout this application.

In one or more embodiments of the invention, the persistent storage (130) stores data. The persistent storage (130) may include a data node monitoring information repository (132), a data limit information repository (134), a bandwidth limit information repository (136), and primary data node monitoring information (138). The persistent storage (130) may store other and/or additional data without departing from the invention. Each of the aforementioned types of data stored in the persistent storage (130) is discussed below.

The data node monitoring information repository (132) may be one or more data structures that include information regarding the access and/or usage of the shared storages (110, FIG. 1A) associated with each data node of the data nodes (100, FIG. 1A). The data node monitoring information may specify the data protection information associated with the shared storages (110, FIG. 1A) and the workload information associated with each of the shared storages (110, FIG. 1A) of each data node of the data nodes (100). The information included in the data node monitoring information repository (132) may be used by the primary data node application agent (112) to perform data protection management services as discussed in the methods illustrated in FIGS. 3A-3B. The data node monitoring information may be generated by the data nodes (100, FIG. 1A) and sent to the primary data node (102) periodically and/or in response to a request from the primary data node (102). The data node monitoring information repository (132) may include other and/or additional information without departing from the invention. For additional information regarding the data node monitoring information repository (132), refer to FIG. 2.

The data limit information repository (134) may include one or more data structures that may include data limit information associated with data nodes (100, FIG. 1A). The data limit information may include a list of data limits. In one or more embodiments of the invention, the data limits specify a portion of a shared storage (e.g., 110A, FIG. 1A) to which a data node may be assigned to perform data protection services. The data limits may include a limit on the number of input and output operations (i.e., read operations and/or write operations), a limit on the quantity of data associated with the input and output operations, and/or a limit on the capacity or quantity of storage space of the shared storage (e.g., 110A, FIG. 1A) a data node (e.g., 104A, FIG. 1A) may use to perform data protection services. The data limits may include other and/or additional information regarding data nodes access to shared storages (120, FIG. 1A) associated with the performance of data protection services. Each data limit included in the list of data limits may be associated with a data node identifier, which may refer to a global, unique bit string that may be used to specify a particular data node. The data limit information of the data limit information repository (134) may be generated by the primary data node application agent (112) during the performance of data protection management services and may be used by data nodes (100) to perform data protection services. The data limit information repository (134) may include other and/or additional information without departing from the invention.

The bandwidth limit information repository (136) may include one or more data structures that may include bandwidth limit information associated with data nodes (100, FIG. 1A). The bandwidth limit information may include a list of bandwidth limits. In one or more embodiments of the invention, a bandwidth limit specifies a portion of network bandwidth associated with a shared storage (e.g., 110A, FIG. 1A) a data node may be assigned to perform data protection services. The bandwidth limits may include other and/or additional information regarding data nodes' network access to shared storages (120, FIG. 1A) associated with the performance of data protection services. Each bandwidth limit included in the list of bandwidth limits may be associated with a data node identifier, which may refer to a global, unique bit string that may be used to specify a particular data node. The bandwidth limit information of the bandwidth limit information repository (136) may be generated by the primary data node application agent (112) during the performance of data protection management services and may be used by data nodes (100) to perform data protection services. The bandwidth limit information repository (136) may include other and/or additional information without departing from the invention.

The primary data node monitoring information (138) may include one or more data structures that include monitoring information associated with the primary data node (102). The primary data node monitoring information (138) may be generated by the primary data node application agent (112) during the performance of data protection services and may be used to generated data limits and bandwidth limits associated with the primary data node (102). The primary data node monitoring information may be a portion of the data node monitoring information included in the data node monitoring information repository (132) discussed above. For additional information regarding the primary data node monitoring information (138), refer to FIG. 2.

The persistent storage (130) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (130) may utilize portions of any combination of hard disk drives, solid state disk drives, tape drives, and/or any other physical storage medium of any number of computing devices.

Figure 1C:
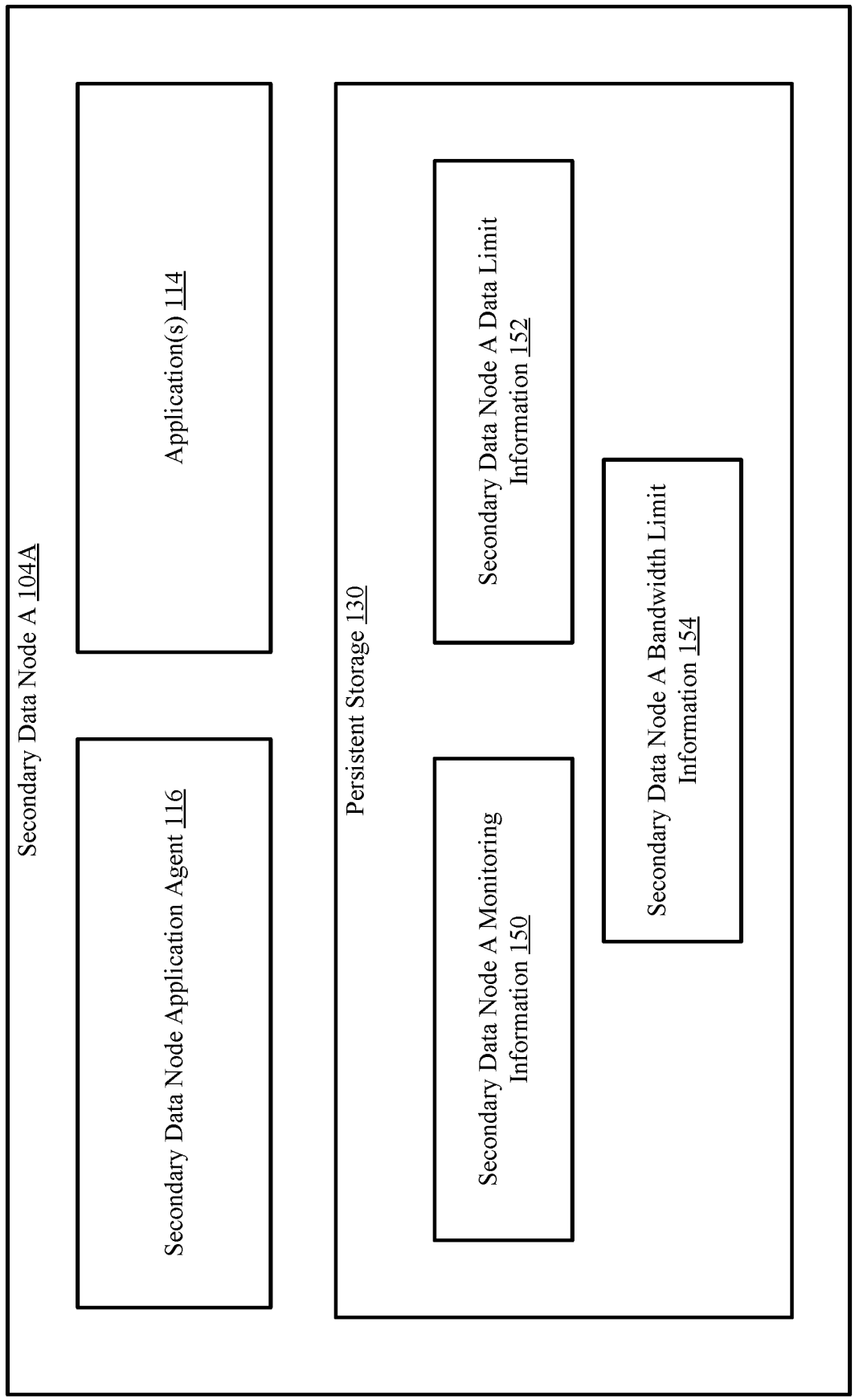
FIG. 1C shows a diagram of a secondary data node in accordance with one or more embodiments of the invention.

FIG. 1C shows a diagram of a secondary data node in accordance with one or more embodiments of the invention. The secondary data node A (104A) may be an embodiment of a secondary data node (e.g., 104A, FIG. 1A) discussed above. As discussed above, secondary data node A (102) may provide services to clients and/or other entities not shown in the system illustrated in FIG. 1A and obtain backup storage services from the backup storage (120, FIG. 1A). Additionally, secondary data node A (104A) may also perform data protection services for data associated with the primary data node stored on shared storages (120, FIG. 1A). Secondary data node A (104A) may provide and/or obtain other and/or additional services without departing from the invention. To provide the aforementioned functionality, secondary data node A (104A) may include a secondary data node application agent (116), application(s) (114) and persistent storage (130). Secondary data node A (104A) may include other and/or additional components without departing from the invention. Each of the aforementioned components is discussed below.

In one or more embodiments of the invention, the secondary data node application agent (116) includes the functionality to perform data protection services as discussed above. The data protection services may include (i) generating backups of data stored in the shared storages (110, FIG. 1A) based on data limits and bandwidth limits assigned to secondary data node A (104A) and obtained from the primary data node (102, FIG. 1A) (ii) storing the generated backups in the backup storage (120, FIG. 1A), and (iii) generating monitoring information associated with secondary data node A (104A) and providing the monitoring information to the primary data node (102, FIG. 1A). The data protection services may include other and/or additional services without departing from the invention.

In one or more embodiments of the invention, the secondary data node application agent (116) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the secondary data node application agent (116) described throughout this application.

In one or more embodiments of the invention, the secondary data node application agent (116) is implemented as computer instructions, e.g., computer code, stored on a persistent storage that when executed by a processor of secondary data node A (104A) causes secondary data node A (104A) to provide the functionality of the secondary data node application agent (116) described throughout this application.

In one or more embodiments of the invention, secondary data node A (104A) hosts one or more applications (114). The application(s) (114) may be an embodiment of the application(s) (114, FIG. 1B) discussed above. For additional information regarding the application(s) (114), refer to FIG. 1B.

In one or more embodiments of the invention, the persistent storage (130) stores data. The persistent storage (130) may be an embodiment of the persistent storage (130, FIG. 1B) discussed above. For additional information regarding the persistent storage, refer to FIG. 1B.

The persistent storage (130) may include secondary data node A monitoring information (150), secondary data node A data limit information (152), and secondary data node A bandwidth limit information (154). The persistent storage may store other and/or additional information without departing from the invention. Each of the aforementioned types of information stored in the persistent storage is discussed below.

Secondary data node A monitoring information (150) may include one or more data structures that include monitoring information associated with secondary data node A (104A). Secondary data node A monitoring information (150) may be generated by the primary data node application agent (112) during the performance of data protection services and may be used to generated data limits and bandwidth limits associated with secondary data node A (104A). The primary data node monitoring information may be a portion of the data node monitoring information included in the data node monitoring information repository (132) discussed above. For additional information regarding secondary data node A monitoring information (150), refer to FIG. 2.

Secondary data node A data limit information (152) may include one or more data structures that may include data limit information associated with secondary data node A (104A). The data limit information may include a list of data limits. In one or more embodiments of the invention, the data limits specify a portion of a shared storages (e.g., 110A, FIG. 1A) secondary data node A (104A) may be assigned to perform data protection services. The data limits may include a limit on the number of input and output operations (i.e., read operations and/or write operations), a limit on the quantity of data associated with the input and output operations, and/or a limit on the capacity or quantity of storage space of the shared storage (e.g., 110A, FIG. 1A) secondary data node A (104A) may use to perform data protection services. Each data limit included in the list of data limits may be associated with a shared storage identifier, which may refer to a global, unique bit string that may be used to specify a particular shared storage of the shared storages (120, FIG. 1A). The data limits may include other and/or additional information regarding secondary data node A's (104A) access to shared storages (120, FIG. 1A) associated with the performance of data protection services. The secondary data node A data limit information (152) may be generated by the primary data node application agent (112) during the performance of data protection management services and may be used by the secondary data node application agent (104A) to perform data protection services. The secondary data node A data limit information (104A) may include other and/or additional information without departing from the invention.

The secondary data node A bandwidth limit information (154) may include one or more data structures that may include bandwidth limit information associated with secondary data node A (104A). The secondary data node A bandwidth limit information (154) may include a list of bandwidth limits. In one or more embodiments of the invention, a bandwidth limit specifies a portion of network bandwidth associated with a shared storage (e.g., 110A, FIG. 1A) a data node may be assigned to perform data protection services. The bandwidth limits may include other and/or additional information regarding secondary data node A (104A) network access to shared storages (120, FIG. 1A) associated with the performance of data protection services. Each bandwidth limit included in the list of bandwidth limits may be associated with a shared storage identifier, which may refer to a global, unique bit string that may be used to specify a particular shared storage of the shared storages (120, FIG. 1A). The secondary data node A bandwidth limit information (154) may be generated by the primary data node application agent (112) during the performance of data protection management services and may be used by the secondary data node application agent (116) to perform data protection services. The secondary data node A bandwidth limit information (154) may include other and/or additional information without departing from the invention.

Figure 2:
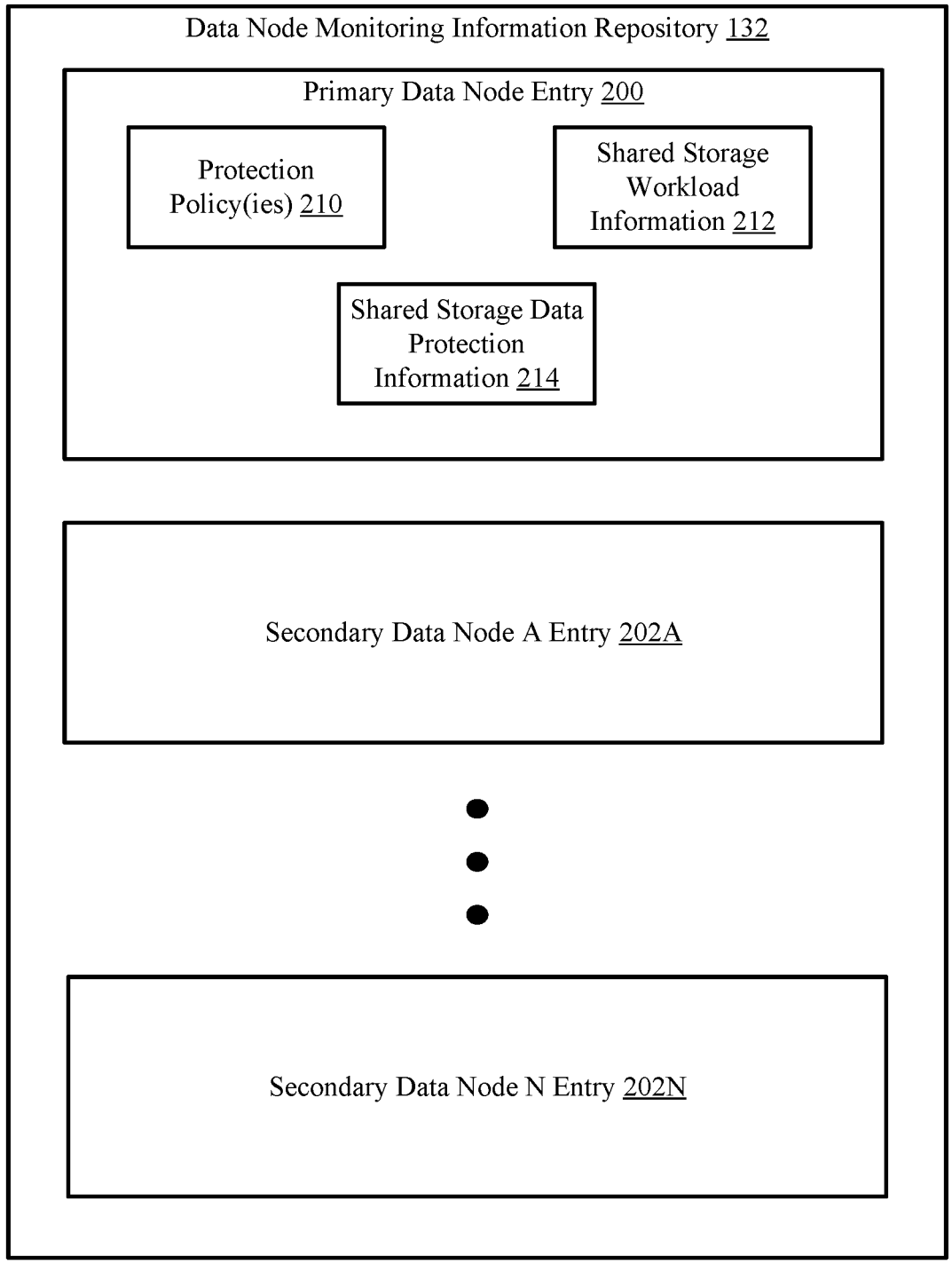
FIG. 2 shows a diagram of a data node monitoring information repository in accordance with one or more embodiments of the invention.

FIG. 2 shows a diagram of a data node monitoring information repository in accordance with one or more embodiments of the invention. The data node monitoring information repository may be an embodiment of the data node monitoring information repository (132, FIG. 1B) discussed above. As discussed above, the data node monitoring information repository (132) may include information regarding the access and/or usage of the shared storages (110, FIG. 1A) associated with each data node of the data nodes (100, FIG. 1A). The data node monitoring information repository (132) may include a primary data node entry (200) and any quantity of secondary data node entries. The data node monitoring information repository (132) may include a secondary data node A entry (202A) and a secondary data node N entry (202N). The secondary data node A entry (202A) and the secondary data node N entry (202N) may include shared storage workload information (212) and data protection workload information (214) associated with secondary data node A (104A, FIG. 1A) and secondary data node N (104N, FIG. 1A) respectively.

In one or more embodiments of the invention, primary data node entry (200) includes one or more protection policies (210), shared storage workload information (212), and shared storage data protection information (214). The one or more protection policies (210) may include information regarding data protection requirements associated with data generated by the applications of the primary data node (e.g., 102, FIG. 1A) and any quantity of secondary data nodes (e.g., 104A, 104N, FIG. 1A) associated with the protection policies (210). The data protection requirements may specify a schedule to perform data protection services on the data generated by the applications of the primary data node (102, FIG. 1A), the shared storage identifiers associated with the primary data node (102, FIG. 1A), and other and/or additional information regarding the backup requirements of data generated by the applications of the primary data node (102, FIG. 1A). The one or more protection policies may also include user specified data limits associated with the shared storages that may be generated by users of the primary data node (102, FIG. 1A). Each user specified data limit may be associated with an application identifier and/or a shared storage identifier.

The shared storage workload information (212) may include information associated with the application workload access to shared storages. The shared storage workload information (212) may specify the shared storages in which application data is stored, the amount of application data stored in the shared storages, application workload input and output operations associated with the shared storages and the quantity of data associated with the input and output operations, the shared storages bandwidth associated with the application workloads, and/or other and/or additional information regarding the primary data node (102, FIG. 1A) application workload access of the shared storages. The shared storage workload information (212) may include other and/or additional information without departing from the invention.

The shared storage data protection information (214) may include information associated with the primary data node application agent data protection workload access to shared storages. The shared storage data protection information may specify the shared storages in which application data to be backed up is stored, the amount of application data stored in the shared storages, previous data protection workload input and output operations associated with the shared storages and the quantity of data associated with the input and output operations, the shared storages bandwidth associated with the data protection workloads, and/or other and/or additional information regarding the primary data node (102, FIG. 1A) data protection workload access of the shared storages (120, FIG. 1A). The shared storage data protection information (214) may include other and/or additional information without departing from the invention.

Figure 3A:
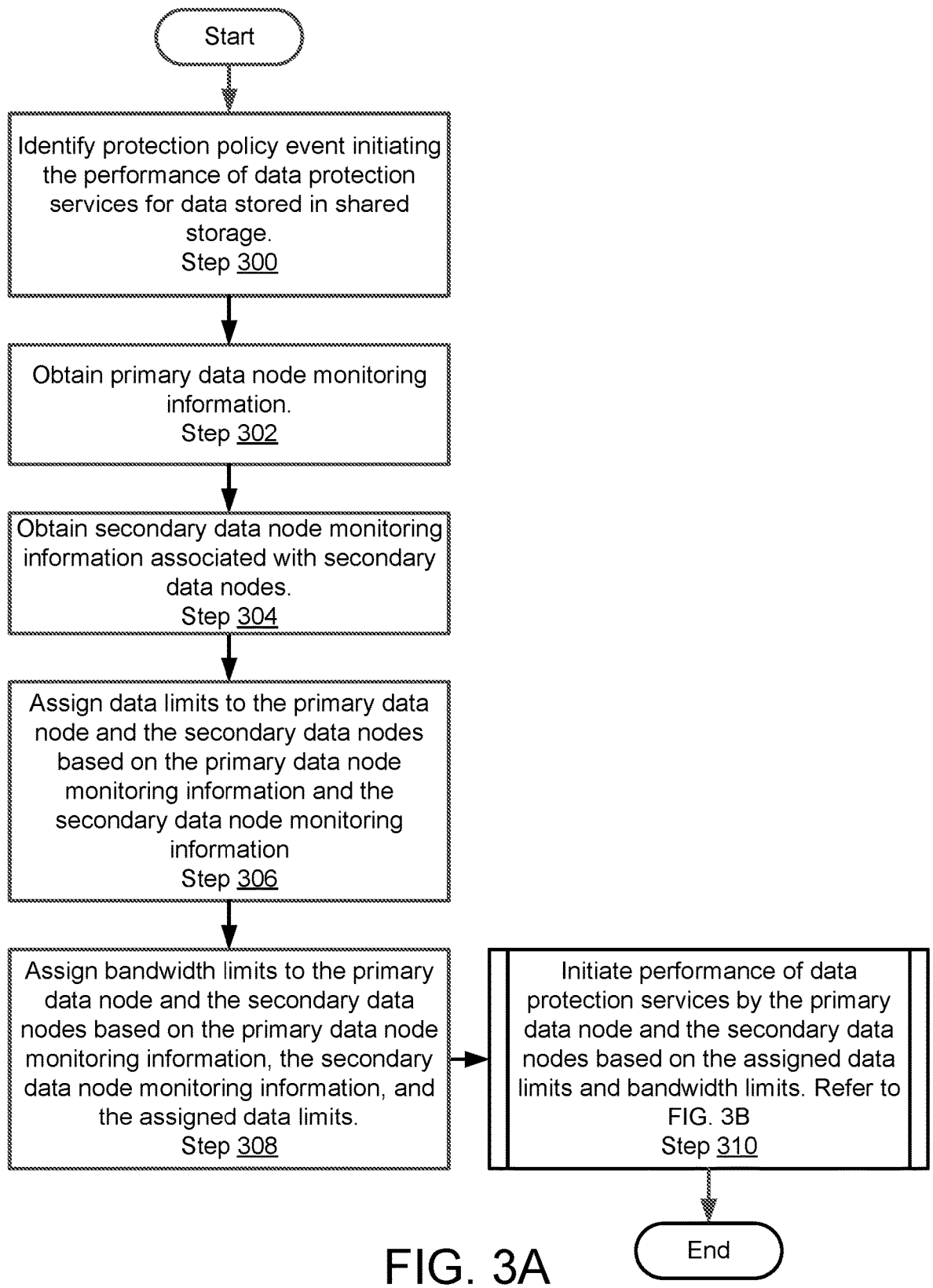
FIG. 3A shows a flowchart of a method for initiating the performance of data protection services using a shared storage in accordance with one or more embodiments of the invention.

FIG. 3A shows a flowchart of a method for initiating the performance of data protection services using a shared storage in accordance with one or more embodiments of the invention. The method may be performed by, for example, a primary data node application agent (112, FIG. 1B) of a primary data node (102, FIG. 1A). Other components of the system illustrated in FIG. 1A may perform all, or a portion of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In step 300, a protection policy event initiating the performance of data protection services for data stored in shared storage is identified.

In one or more embodiments of the invention, the protection policy event is identified by the primary data node application agent as a point in time specified by a protection policy associated with the performance of data protection services for application data stored in a shared storage. In one embodiment, the backup agent may include a protection policy associated with the application data stored in a shared storage that specifies points in time to perform data protection services for the application data stored in the shared storage. The primary data node application agent may monitor the protection policy and identify when a point in time specified by the protection policy occurs. The protection policy may include the application identifiers, the data node identifiers, and the shared storage identifier associated with the application data corresponding with the protection policy. The identification of the point in time specified by the protection policy may result in the identification of the protection policy event by the primary data node application agent. The protection policy event initiating the performance of data protection services for data (i.e., application data) stored in the shared storage may be identified via other and/or additional methods without departing from the invention.

In step 302, a primary data node monitoring information is obtained.

In one or more embodiments of the invention, the primary data node application agent obtains primary data node monitoring information from the persistent storage of the primary data node. The primary data node application agent may periodically generate primary data node monitoring information associated with the performance of application workloads and the performance of previously performed data protection workloads as a result of previously performed data protection services. The primary data node monitoring information may be obtained via other and/or additional methods without departing from the invention.

In step 304, secondary data node monitoring information associated with the secondary data nodes is obtained.

In one or more embodiments of the invention, the primary data node application agent obtains the secondary data node monitoring information from the persistent storage of the primary data node or from the secondary data nodes. The secondary data node application agents of the secondary data nodes may periodically generate secondary data node monitoring information associated with the performance of application workloads and the performance of previously performed data protection workloads as a result of previously performed data protection services associated with the secondary data nodes. The secondary data node application agents of the secondary data nodes may send the generated secondary data node monitoring information to the primary data node when the secondary data node monitoring information is generated or in response to a request obtained from the primary data node application agent. The secondary data node monitoring information may be obtained via other and/or additional methods without departing from the invention.

In step 306, data limits are assigned to the primary data node and the secondary data nodes based on the primary data node monitoring information and the secondary data node monitoring information.

In one or more embodiments of the invention, the primary data node application agent assigns data limits to the primary data node and the secondary data nodes based on the availability of the shared storage. The primary data node application agent may use the primary data node monitoring information and the secondary monitoring information determine the availability and capacity of the shared storage. The primary data node may then assign a data limit, or a portion of the shared storage, to each of the data nodes based on the availability and capacity of the shared storage and/or based on a user specified data limit associated with a data node included in the protection policy. As a result, each data node may be assigned a portion of the available capacity of the shared storage to perform data protection services without negatively impacting the performance of the application workloads of the data nodes using the shared storages. Data limits may be assigned to the primary data node and the secondary data nodes based on the primary data node monitoring information and the secondary data node monitoring information via other and/or additional methods without departing from the invention.

In step 308, bandwidth limits are assigned to the primary data node and the secondary data nodes based on the primary data node monitoring information, the secondary data node monitoring information, and the assigned data limits.

In one or more embodiments of the invention, the primary data node application agent uses a machine learning or an artificial intelligence algorithm to assign the bandwidth limit to the primary data node and the secondary data nodes. The primary data node application agent may further include the functionality to apply a machine learning and/or an artificial intelligence algorithm to the assigned data limits, primary data node monitoring information, and the secondary data node monitoring information to assign bandwidth limits. The primary data node application agent may also include the functionality to periodically retrain and/or update the machine learning and/or artificial intelligence algorithm based on previously assigned data limits, previously assigned bandwidth limits, previously performed application workloads, and previously performed data protection workloads specified by the primary node monitoring information and the secondary data node monitoring information. The machine learning or artificial intelligence algorithm may assign larger proportions of the available network bandwidth associated with the shared storage to the data nodes with larger data limits. The machine learning or artificial intelligence algorithm may be any type of machine learning or artificial intelligence algorithm that includes the aforementioned functionality without departing from the invention. Bandwidth limits may be assigned to the primary data node and the secondary data nodes based on the primary data node monitoring information, the secondary data node monitoring information, and the assigned data limits via other and/or additional methods without departing from the invention.

In step 310, the performance of the data protection services by the primary data node and the secondary data nodes based on the assigned data limits and assigned bandwidth limits is initiated.

In one or more embodiments of the invention, the primary data protection application agent initiates the performance of the data protection services by sending messages to the secondary data nodes. Each message may include the assigned data limit and bandwidth limit associated with the secondary node and a request to perform data protection services by performing the data protection workload using the data limit and the bandwidth limit Upon receiving the messages, secondary data node application agents of the secondary data nodes may perform the data protection services. After sending the messages, the primary data node application agent may perform data protection services using the data limit and the bandwidth limit associated with the primary data node. The performance of the data protection services by the primary data node and the secondary data nodes based on the assigned data limits and assigned bandwidth limits may be initiated via other and/or additional methods without departing from the invention. For additional information regarding initiating the performance of the data protection services by the primary data node and the secondary data nodes based on the assigned data limits and assigned bandwidth limits, refer to FIG. 3B.

The method may end following step 310.

Figure 3B:
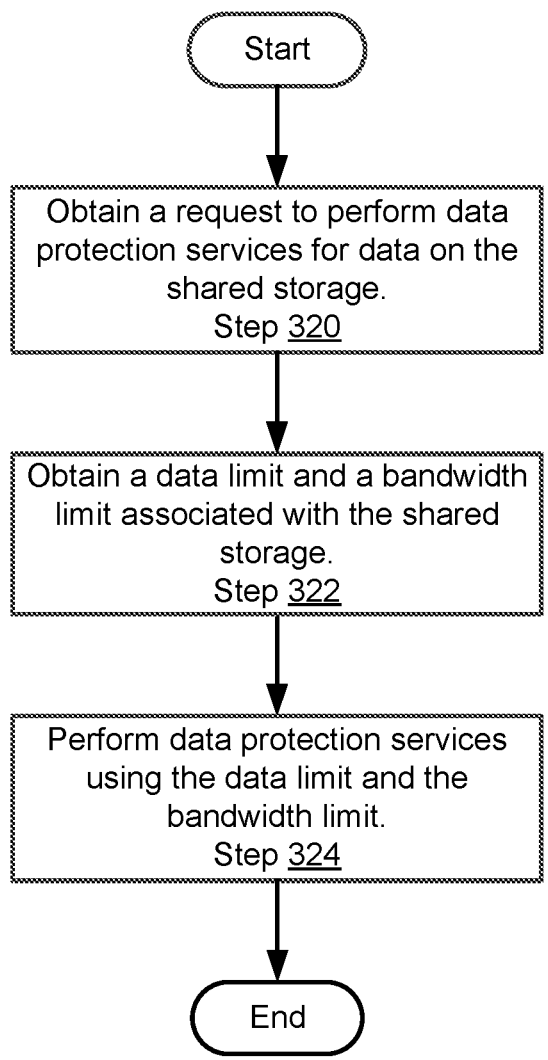
FIG. 3B shows a flowchart of a method for performing data protection services in accordance with one or more embodiments of the invention.

FIG. 3B shows a flowchart of a method for performing data protection services in accordance with one or more embodiments of the invention. The method may be performed by, for example, a secondary data node application agent (e.g., 116, FIG. 1B) of a secondary data node (e.g., 104A, FIG. 1A). Other components of the system illustrated in FIG. 1A may perform all, or a portion of the method of FIG. 3B without departing from the invention.

While FIG. 3B is illustrated as a series of steps, any of the steps may be omitted, performed in a different order, additional steps may be included, and/or any or all of the steps may be performed in a parallel and/or partially overlapping manner without departing from the invention.

In step 320, a request to perform data protection services for data stored on the shared storage is obtained.

In one or more embodiments of the invention, the secondary data node application agent obtains a message from the primary data node application agent as discussed above. The message may include a request to perform the data protection services. The request may include the application identifier and the storage identifier associated with the data protection services. The request to perform the data protection services for data stored in the shared storage may be obtained via other and/or additional methods without departing from the invention.

In step 322, a data limit and a bandwidth limit associated with the shared storage is obtained.

In one or more embodiments of the invention, the secondary data node application agent obtains the data limit and the bandwidth limit from the message obtained in step 320, or from another message. In one embodiment of the invention, the message obtained in step 320 may include the assigned data limit and the assigned bandwidth limit. In one embodiment of the invention, the message obtained in step 320 may not include the assigned data limit and the assigned bandwidth limit. In scenarios in which the message obtained in step 320 does not include the assigned data limit and the assigned bandwidth limit, the secondary data node application agent may send a request to the primary data node application agent to obtain the assigned data limit and the assigned bandwidth limit associated with the secondary data node. The request may include the data node identifier associated with the secondary data node. In response to obtaining the request, the primary data node identifier sends the assigned data limit and the assigned bandwidth limit to the secondary data node application agent. A data limit and a bandwidth limit associated with the shared storage may be obtained via other and/or additional methods without departing from the invention.

In step 324, data protection services using the data limit and the bandwidth limit are performed.

In one or more embodiments of the invention, the secondary data node application agent performs the data protection services by performing the data protection workload using the data limit and the bandwidth limit to generate a backup of the application data stored on the shared storage. The secondary data node application agent may store the backup of the application agent in the backup storage. During the performance of the data protection services, the secondary data node application agent may not exceed the network bandwidth limit and the data limit. The performance of the data protection services may be independent of the performance of data protection services by other data nodes. In other words, the secondary data node application agent may perform the data protection services without knowledge of or dependence on the data protection services performed by the other data nodes using the shared storage. As a result, data protection services may be performed by the data nodes without negatively impacting other data protection services of other data nodes and the performance of application workloads competing for access to the shared storage. Data protection services using the data limit and the bandwidth limit may be performed via other and/or additional methods without departing from the invention.

The method may end following step 324.

Figure 4:
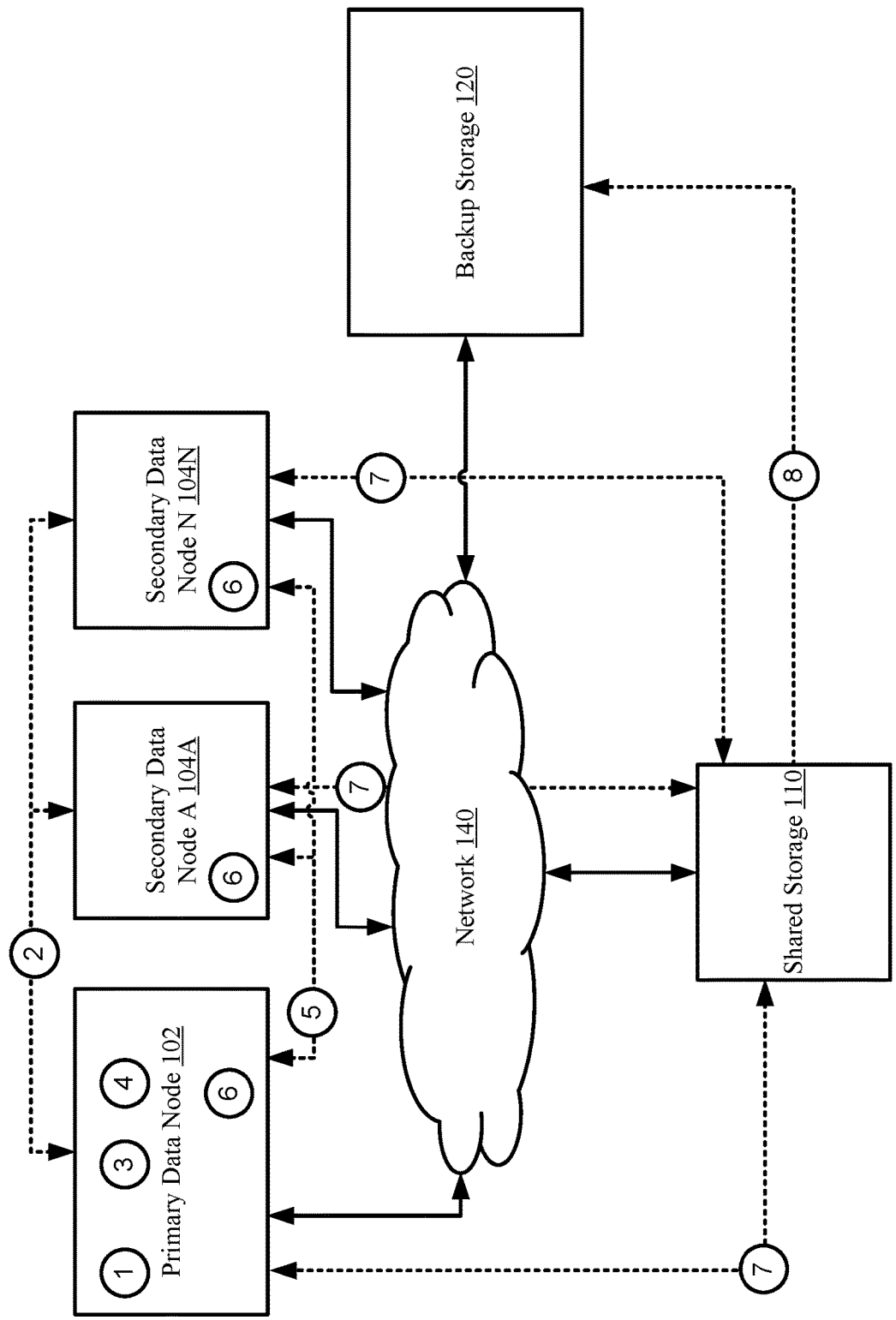
FIG. 4 shows a diagram of the operation of an example system over time in accordance with one or more embodiments of the invention.

To further clarify embodiments of the invention, a non-limiting example is provided in FIG. 4. FIG. 4 shows a diagram of operations performed by an example system over time in accordance with one or more embodiments of the invention. FIG. 4 may show a system similar to that illustrated in FIG. 1A. Actions performed by components of the system are illustrated by numbered, circular boxes interconnected with arrowed lines. For the sake of brevity, only a limited number of components illustrated in FIG. 1A are illustrated in FIG. 4.

Example

Turning to FIG. 4, consider a scenario in which a primary data node (102) and two secondary data nodes, secondary data node A (104A) and secondary data node N (104N) are operably connected to a shared storage (110) and a backup storage (120) through a network (140). At step 1, the primary data node (102) identifies a protection policy event associated with data generated by applications executing on the primary data node (102), secondary data node A (104A), and secondary data node N (104N). The data is stored on the shared storage (110).

In response to identifying the protection policy event, at step 2, the primary data node (102) obtains secondary data node monitoring information from secondary data node A (104A) and secondary data node N (104N) and obtains primary data node monitoring information from persistent storage of the primary data node (102). At step 3, the primary data node (102) assigns data limits to the primary data node (102), secondary data node A (104A), and secondary data node N (104N). Each data limit is associated with a portion of the available capacity of the shared storage that the corresponding data node may use to perform data protection services.

After assigning the data limits, at step 5, the primary data node (102) uses a machine learning algorithm applied to the assigned data limits, the primary data node monitoring information, and the secondary monitoring information, to assign bandwidth limits to the primary data node (102), secondary data node A (104A), and secondary data node N (104N). Each bandwidth limit is associated with a portion of the available network bandwidth of the shared storage (110) that the corresponding data node may use to perform data protection services. At step 5, the primary data node sends the assigned data limits and bandwidth limits associated with the secondary data nodes to secondary data node A (104A) and secondary data node N (104N). After each data node obtains its corresponding data limit and bandwidth limit, at step 6, the data protection services associated with the primary data node (102), secondary data node A (104A), and secondary data node N (104N) are initiated. At step 7, the primary data node (102), secondary data node A (104A), and secondary data node N (104N) independently perform data protection services without exceeding the corresponding data limits and the bandwidth limits to generate a backups of application data stored on the shared storage (110). At step 8, the backups are stored on the backup storage (120).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to limiting access to shared storage during the performance of data protection services. A primary data node application agent may assign data limits and bandwidth limits to each data node performing the data protection services based on monitoring information associated with the performance of data protection workloads and application workloads for each data node. The monitoring information enables the primary data node application agent to assign portions of available capacity of the shared storage and portions of available network capacity of the shared storage to the data nodes as data limits and bandwidth limits respectively. Each data node independently performs data protection services using the corresponding data limits and bandwidth limits. As a result, each data node may be able to provide data protection services for data stored in shared storage without negatively impacting the performance of other data protection services and application workloads of other data nodes competing for access to the shared storage. Therefore, the efficiency of performing data protection services by multiple data clusters for data stored in a shared storage may be increased.

Thus, embodiments of the invention may address the problem of inefficient use of computing resources to store and protect data in a shared storage. This problem arises due to the technological nature of the environment in which the data of the shared storage is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for performing data protection services for data stored in a shared storage, the method comprising:
   identifying, by a primary data node, a protection policy event initiating performance of data protection services for data stored in the shared storage, wherein the shared storage is used by the primary data node and secondary data nodes;
   in response to identifying the protection policy event:
      obtaining primary data node monitoring information associated with the primary data node;
      obtaining secondary data node monitoring information associated with the secondary data nodes;
      assigning at least one resource limit to the primary data node and the secondary data nodes based on the primary data node monitoring information and the secondary data node monitoring information; and initiating performance of the data protection services by the primary data node and the secondary data nodes using the shared storage based on the assigned at least one resource limit.

2. The method of claim 1, wherein assigning at least one resource limit comprises at least one of:

assigning data limits to the primary data node and the secondary data nodes based on the primary data node monitoring information and the secondary data node monitoring information; and assigning bandwidth limits to the primary data node and the secondary data nodes based on the primary data node monitoring information, the secondary data node monitoring information, and the data limits.

3. The method of claim 2, wherein assigning data limits to the primary data node and the secondary data nodes based on the primary data node monitoring information and the secondary data node monitoring information comprises:

assigning a first data limit to the primary data node;

assigning a second data limit to a first secondary data node of the secondary data nodes; and assigning a third data limit to a second data nodes of the secondary data nodes.

4. The method of claim 2, wherein assigning bandwidth limits to the primary data node and the secondary data nodes based on the primary data node monitoring information, the secondary data node monitoring information, and the data limits comprises:

assigning a first bandwidth limit to the primary data node;

assigning a second bandwidth limit to a first secondary data node of the secondary data nodes; and assigning a third bandwidth limit to a second secondary data node of the secondary data nodes.

5. The method of claim 1, wherein the primary data node monitoring information specifies a primary data node production load and a primary data node data protection load associated with the shared storage.

6. The method of claim 5, wherein the secondary data node monitoring information specifies secondary data node production loads and secondary data protection loads associated with the shared storage.

7. The method of claim 1, wherein the at least one resource limit specifies a data limit of the shared storage that the primary data node or the secondary data node uses to perform data protection services.

8. The method of claim 1, wherein the at least one resource limit specifies a portion of network bandwidth associated with the shared storage assigned to the primary data node or the secondary data node.

9. A system for performing data protection services for data stored in a shared storage, the system comprising:

a shared storage; and a primary data node, wherein the primary data node is programmed to:

identify a protection policy event initiating performance of data protection services for data stored in the shared storage, wherein the shared storage is used by the primary data node and secondary data nodes;

in response to identifying the protection policy event:

obtain primary data node monitoring information associated with the primary data node;

obtain secondary data node monitoring information associated with the secondary data nodes;

assign at least one resource limit to the primary data node and the secondary data nodes based on the primary data node monitoring information and the secondary data node monitoring information; and initiate performance of the data protection services by the primary data node and the secondary data nodes using the shared storage based on the assigned at least one resource limit.

10. The system of claim 9, wherein assigning at least one resource limit comprises at least one of:

assigning data limits to the primary data node and the secondary data nodes based on the primary data node monitoring information and the secondary data node monitoring information; and assigning bandwidth limits to the primary data node and the secondary data nodes based on the primary data node monitoring information, the secondary data node monitoring information, and the data limits.

11. The system of claim 10, wherein assigning data limits to the primary data node and the secondary data nodes based on the primary data node monitoring information and the secondary data node monitoring information comprises:

assigning a first data limit to the primary data node;

assigning a second data limit to a first secondary data node of the secondary data nodes; and assigning a third data limit to a second data nodes of the secondary data nodes.

12. The system of claim 10, wherein assigning bandwidth limits to the primary data node and the secondary data nodes based on the primary data node monitoring information, the secondary data node monitoring information, and the data limits comprises:

assigning a first bandwidth limit to the primary data node;

assigning a second bandwidth limit to a first secondary data node of the secondary data nodes; and assigning a third bandwidth limit to a second secondary data node of the secondary data nodes.

13. The system of claim 9, wherein the primary data node monitoring information specifies a primary data node production load and a primary data node data protection load associated with the shared storage.

14. The system of claim 13, wherein the secondary data node monitoring information specifies secondary data node production loads and secondary data protection loads associated with the shared storage.

15. The system of claim 9, wherein the at least one resource limit specifies a data limit of the shared storage that the primary data node or the secondary data node uses to perform data protection services.

16. The system of claim 9, wherein the at least one resource limit specifies a portion of network bandwidth associated with the shared storage assigned to the primary data node or the secondary data node.

17. A non-transitory computer readable medium comprising computer readable program code, which when executed by a computer processor enables the computer processor to perform a method for performing data protection services for data stored in a shared storage, the method comprising:

identifying, by a primary data node, a protection policy event initiating performance of data protection services for data stored in the shared storage, wherein the shared storage is used by the primary data node and secondary data nodes;

in response to identifying the protection policy event:

obtaining primary data node monitoring information associated with the primary data node;

obtaining secondary data node monitoring information associated with the secondary data nodes;

assigning at least one resource limit to the primary data node and the secondary data nodes based on the primary data node monitoring information and the secondary data node monitoring information; and initiating performance of the data protection services by the primary data node and the secondary data nodes using the shared storage based on the assigned at least one resource limit.

18. The non-transitory computer readable medium of claim 17, wherein assigning at least one resource limit comprises at least one of:

assigning data limits to the primary data node and the secondary data nodes based on the primary data node monitoring information and the secondary data node monitoring information; and assigning bandwidth limits to the primary data node and the secondary data nodes based on the primary data node monitoring information, the secondary data node monitoring information, and the data limits.

19. The non-transitory computer readable medium of claim 18, wherein assigning data limits to the primary data node and the secondary data nodes based on the primary data node monitoring information and the secondary data node monitoring information comprises:

assigning a first data limit to the primary data node;

assigning a second data limit to a first secondary data node of the secondary data nodes; and assigning a third data limit to a second data nodes of the secondary data nodes.

20. The non-transitory computer readable medium of claim 18, wherein assigning bandwidth limits to the primary data node and the secondary data nodes based on the primary data node monitoring information, the secondary data node monitoring information, and the data limits comprises:

assigning a first bandwidth limit to the primary data node;

assigning a second bandwidth limit to a first secondary data node of the secondary data nodes; and assigning a third bandwidth limit to a second secondary data node of the secondary data nodes.

* * * * *